United States Patent Office 3,256,733
Patented June 21, 1966

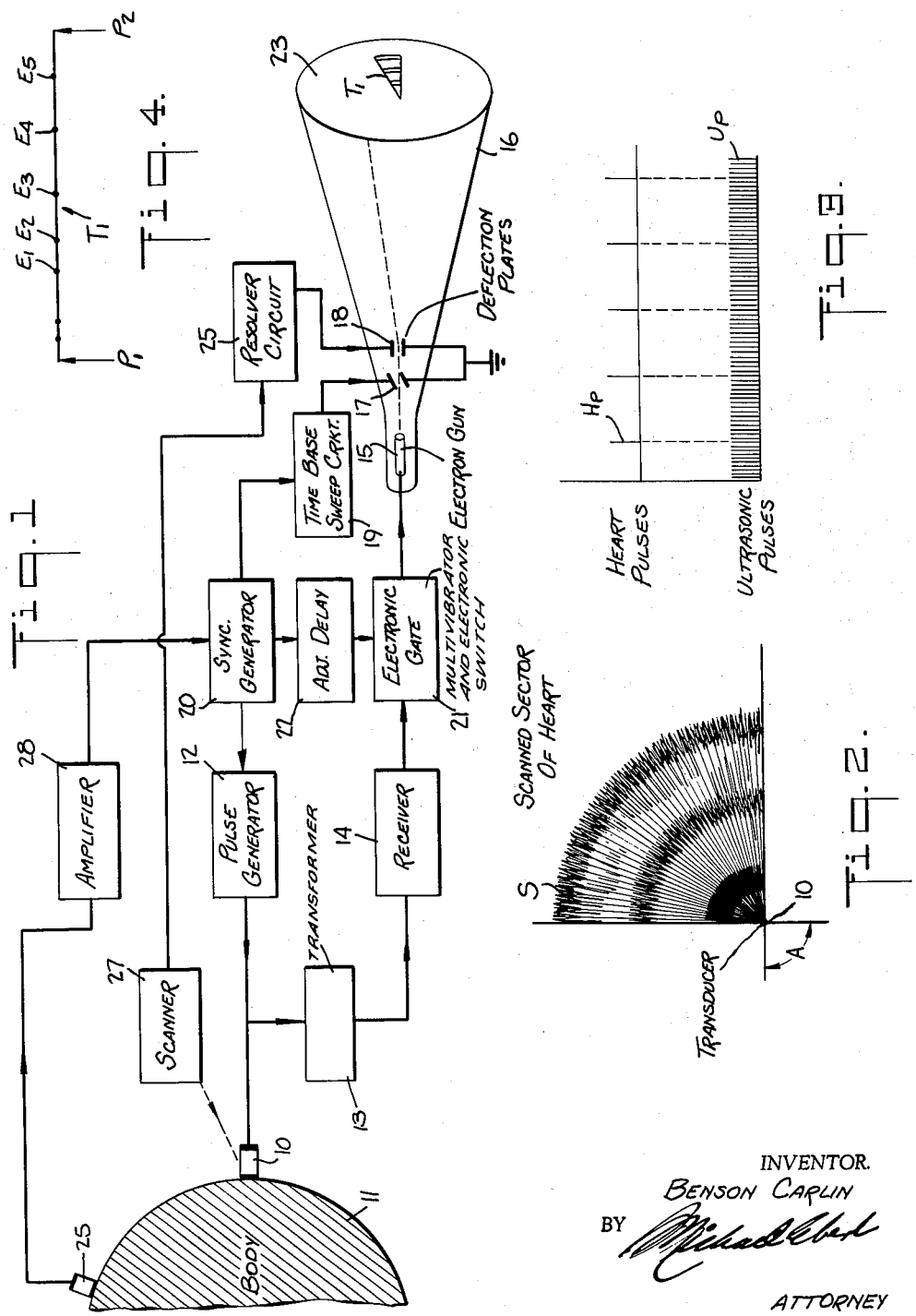

3,256,733
ULTRASONIC PULSE-ECHO APPARATUS FOR INTERNAL EXPLORATION
Benson Carlin, Fair Lawn, N.J., assignor, by mesne assignments, to Air-Shields, Inc., Hatboro, Pa., a corporation of Delaware
Filed Feb. 6, 1963, Ser. No. 256,769
8 Claims. (Cl. 73—67.8)

This invention relates generally to ultrasonic techniques for exploring internal structure, and more particularly to ultrasonic pulse-echo techniques for mapping the internal structure of living organisms.

In recent years attempts have been made to employ ultrasonic techniques in exploring the internal structure of living organisms. This technique has been used to measure and record the dimensions and position of deep-lying organs, and physiological structure throughout the body. One important advantage of ultrasonics is that it is non-destructive and free of the hazards incident to the use of X-ray or Gamma ray examination. Unlike X-ray, ultrasonics is also sensitive to changes in elasticity of tissue as well as to changes in density. Further, pulse methods allow the depth from which an echo is reflected to be known, so that objects examined are also located in depth.

In the ultrasonic exploratory techniques, a series of very short ultrasonic pulses is projected in a narrow, straight beam in the direction to be viewed. For this purpose, a transducer is placed on the skin and coupled thereto with a cream or fluid. Measurements are based on the amount of time for an echo to return and also on the amplitude of the echo. Echoes are produced from biologic structures which present a different acoustic impedance to the travelling pulses. Thus, interfaces reflect not only if they are of different density, but also if they are of different elasticity. This is the basis for the high degree of differentiation that is possible among soft tissues by this means.

It has been known to provide a pulse-echo ultrasonic method in combination with standard scanning procedures to produce patterns on a cathode ray viewing screen representative of the internal structure being scanned. Echo pulses may be displayed on an "A" type cathode-ray indicator, the echo pulses from the different reflecting targets being displayed as "pips" of varying height along the time base sweep line on the screen. The height of each pip is indicative of the relative reflectivity of the target, whereas the displacement of the pip with respect to the point of origin of the sweep lines is indicative of the distance between the target and the transducer.

Echo pulses may also be displayed on a "B" type cathode-ray indicator wherein the cathode beam is intensity-modulated by returning echoes as the transducer beam is shifted across a particular area of the body, and the electron beam is deflected in synchronism therewith. In this presentation the view is similar to a cross-section taken at right angles to the transducer travel.

An organ of particular interest is the heart, especially in the region of the mitral valve, which falls directly under the third or fourth interspace of the ribs, and is therefore easy to scan by means of ultrasonic techniques. The wall of the heart in that region as well as the muscle which makes up the valve, will move back and forth about 2 to 3 cms. Since with each heart action the wall is closer to the transducer at one time and further removed at another, this distance can be measured and the velocity with which the motion takes place determined, to indicate the condition of the heart and the valve.

A "B" type of presentation of the heart action is highly desirable. When, however, one seeks to map the region by the "B" type method, it is found that the resultant presentation has a number of wavy lines superimposed thereover, which create serious difficulties in interpretation. This is due to the fact that the periodic transmission of ultrasonic pulses is in no way related to the periodic beat of the heart.

Accordingly, it is the principal object of this invention to provide an ultrasonic system for exploring internal structure wherein the generation of ultrasonic pulses is synchronized with the heart action to provide an improved visual presentation or other indication.

More specifically, it is an object of the invention to provide a "B" type cathode-ray presentation for an ultrasonic exploratory system in which the generation of pulses and the initiation of the time base sweep are locked in with the heart pulse to effect synchronization therebetween, and hence a proper correlation between the movement of the heart and the ultrasonic irradiation thereof.

For a better understanding of the invention, as well as other objects and further features thereof, reference is made to the following detailed description to be read in conjunction with the accompanying drawing, wherein:

FIG. 1 is a schematic diagram of a simplified pulse-echo ultrasonic system having heart-synchronizing means in accordance with the invention;

FIG. 2 shows a "B" type display developed by the system;

FIG. 3 illustrates the relationship between heart pulses and the ultrasonic pulses transmitted by the system; and FIG. 4 shows a typical time base line.

Referring now to FIG. 1, the system in accordance with the invention includes an ultrasonic transducer 10 which may take the form of barium titanate. This material behaves as an electrostrictive piezoelectric transducer adapted to convert radio-frequency energy into ultrasonic waves, or to convert ultrasonic waves into radio-frequency energy. Thus the transducer is capable of acting as an ultrasonic transmitting or detecting element. The transducer is coupled directly or by a fluid medium to a living organism 11 whose heart is to be examined.

The transducer 10 is excited by means of a pulse generator 12 operating at a carrier frequency in the range, for example, of 1 to 10 megacycles, to produce an exploratory beam. The generator is coupled directly to the transducer. Echo pulses detected by the transducer are applied through a coupling transformer 13 to a receiver 14 tuned to the pulse frequency of the associated transducer to produce output voltage pulses whose magnitudes are in proportion to the amplitude of the echo pulses.

The pulse generator operates at a repetition rate of, say, about 500 to 1000 pulses per second, each pulse being of micro-second duration, whereby a relatively long interval for echo pulse reception exists between successive pulses. In practice, the duration of each pulse may be in the order of five micro-seconds or even shorter, and should be made up of as few cycles of the resonant frequency as possible. In one actual embodiment, a unit was used having a pulse repetition rate of 1000 pulses per second, with a pulse duration of about two micro-seconds at two megacycles, the beam diameter being 1 cm.

Assuming that the transducer 10 is beamed or focused along a path towards a particular region of internal structure, the presence of reflecting targets intercepted by the beam results in echo pulses which will be picked up by the same transducer, the echo pulses returning at different points in time depending on their relative distance from the transducer, as in the case of sonar systems.

The output of the receiver 14 is applied to the intensitymodulation electrode in the electron gun 15 of a cathode ray oscilloscope 16. The electron beam from the gun is electro-statically deflected in orthogonally displaced planes by deflection plates 17 and 18. While electrostatic deflection has been disclosed, it is to be understood that electromagnetic means may be used for the same purpose.

To display the various echo pulses in the path of the beam along a base line, a time base saw-tooth wave generator 19 is coupled to the deflection electrode 17 to deflect the beam along a base line. The operation of the time base circuit and of the sweep circuit is synchronized by a sync generator 20 so that the scanning sweep commences simultaneously with the transmission of the ultrasonic pulse. In practice, the sync generator may be a free-running multivibrator providing output pulses which are simultaneously applied to the pulse generator 12 and to the sweep circuit 19, to cause initiation of the saw-tooth time sweep upon the transmission of an ultrasonic pulse. This multivibrator in turn is controlled by the heart action in a manner to be hereinafter described.

As the electron beam is deflected, its intensity is modulated by the output of the receiver 14. As shown in FIG. 4, where the time base line T represents the period between two successive transmitted pulses $P_1$ and $P_2$, in the interval between these pulses, echo pulses will be received which will intensity-modulate the grid to produce illuminated areas $E_1$, $E_2$, $E_3$, etc., whose spacing relative to the starting point $P_1$ and to each other will depend on their distance or exterior position relative to the transducer. On the screen 23 of the cathode ray tube, the base line $T_1$ represents the return from transmitted pulses which are directed in a beam and an angle which corresponds to the radial angle of the line on the screen. As will be explained later, the direction of the beam is varied to scan a particular sector of the body and the angle of the base line varies accordingly.

Thus the time of arrival of the echo pulse gives an indication of the spatial position of the echo-producing target. The amplitude of the echo pulses and hence the intensity of illumination of the echo area on the screen, will depend on the characteristics of the reflecting structure with respect to the pulse frequency. For example, a bone will ordinarily produce a higher degree of reflectivity than an artery or the heart wall. Similar differences will occur for other internal elements of the human body, depending in a sense on their acoustic properties, very much as objects in an auditorium have different absorption or reflection qualities with respect to sound tones.

We shall assume that echoes $E_1$ and $E_2$ represent reflecting objects or organs in the region of interest, while the other echoes represent targets in a region not to be explored. The first problem is to select echoes $E_1$ and $E_2$ to the exclusion of all others.

In order to select echoes $E_1$ and $E_2$, there is interposed between the output of the receiver 14 and the electron gun 15, an electronic gate 21 which may be of the vacuum-tube or diode type and acts effectively as a switch which is actuated and remains open to pass echo pulses for a limited period. The gate, for example, may be an electronic switch which is normally biased to cut-off and is rendered conductive by the application of a square wave from a one-cyclic multivibrator, the width of the square wave determining the open time of the gate. The gate is opened by the application of a trigger pulse to the multivibrator, this trigger pulse being derived from the sync generator 20 through an adjustable time delay circuit 22.

Thus when a pulse is transmitted, a pulse is derived from sync generator 20 which reappears after a predetermined time interval in the output of the delay circuit 22, this pulse initiating the operation of the gate. By varying the time interval, any group of echo pulses appearing in the interval between transmitted pulses may be selected for examination, and all other pulses rejected. In effect, therefore, the gate position may be shifted along the base line $T_1$ relative to the point of origin representing the instant of transmission.

The main object of the present invention, as pointed out previously, is to provide a so-called "B" display adapted to map a particular region of the heart, especially in the area of the mitral valve. In the "B" type of cathode-ray display, the sweep in one linear direction is a time base which is repeated with each transmitted ultrasonic pulse, while the sweep in the direction perpendicular to the first direction is synchronized with the direction of the ultrasonic beam, the received echoes being applied to the control grid or to the cathode of the cathode ray gun in such a polarity as to brighten the screen.

For purposes of changing the direction of the ultrasonic beam, the transducer 10 may be shifted or rocked back and forth. For this purpose a scanner mechanism 27 is provided operatively coupled to the transducer. As shown in FIG. 2, we shall assume that the scanner rocks the transducer back and forth through an angle A, and thereby causes the ultrasonic beam to scan a sector S in the region of the heart. In order to sweep the cathode ray beam in synchronism with the angular displacement of the ultrasonic beam, a resolver 25 is operatively coupled to the scanner to produce a sweep voltage whose magnitude varies in proportion to the change in angular position of the transducer. For this purpose, the resolver 25 may take the form of a potentiometer coupled to the scanner to produce an output voltage which changes with changes in scan position. The output of the resolver is applied to the horizontal deflection plate 18, whereas the time base sweep voltage from circuit 19 is applied to vertical deflection plates 17.

Thus, as shown in FIG. 2, each of the radial lines represents a single time base sweep $T_1$, whereas the angular position of the line depends at any instant on the corresponding angular position of the ultrasonic beam. Since the echoes are developed by illuminated spots along each base line, as the sector of interest is scanned a map thereof is developed in the gray scale, displaying the internal structure under examination. In FIG. 2, the heavier portions of each radial line represent the increased illumination produced by reflections from internal structure, whereas the thinner portions indicate the absence of reflections. Since the radial lines are produced within a scanner sector, the resultant arcs produced by the successively developed heavier portions represent reflecting walls within the sector, such as the wall of the heart. The pictorial representation is at right angles to the direction of travel of the ultrasonic beam, and is also perpendicular to the transducer direction of motion. In effect, therefore, it is as if the beam were a knife which cuts through a section of the body, the view provided being the cut end section. Since the walls displayed in FIG. 2 are subject to motion with the heart beat and hence move back and forth relative to the transducer from which the pulses are transmitted, the arcs representing the walls have a thickness reflecting the distance traversed by the walls, but these arcs are not wavy, for the pulse transmission is correlated with the heart beat.

Where there is no correlation between the beat of the heart and the transmission of pulses, the resultant map has wavy lines superimposed thereon as a result of the unrelated movement of the heart. To overcome this drawback, a transducer 26 is provided on the body to pick up the heart beat. This transducer may be a sound or pressure sensitive device adapted to produce a single electrical pulse for each heart beat. This pulse is suitably enlarged and sharpened in amplifier 28 and is applied as a trigger to the sync generator 20 to bring about synchronism therebetween.

Thus, as shown in FIG. 3, if the relatively low heart beat pulses $H_p$ are applied to a free-running multivibrator for controlling the frequency both of the pulse generator 12 and the sweep circuit 19, the relatively high-frequency pulses $U_p$ will lock in with the heart pulses, and have a frequency which is a multiple thereof. Consequently, the phase of the heart action will correspond with the phase of the ultrasonic beam, and a wavy display pattern will be avoided, to provide a picture which can be more easily read.

It is not essential that the heart beat be picked up for purposes of synchronization, since it is also possible with an adjustable multivibrator for timing the ultrasonic pulses, to adjust the frequency or repetition rate thereof so that it falls in step with a particular heart action. It is also possible to pick up the heart beat from the output of the transducer 10 rather than by a separate transducer, and in this case it is also necessary to provide a filter or other means to discriminate between the ultrasonic pulse responses and the heart-beat responses.

In FIG. 2, the image shown is in polar coordinates since the transducer is rocked back and forth to scan a sector. It is also possible to produce images in rectangular coordinates by a reciprocating motion of the transducer.

While there has been shown one preferred form of ultrasonic pulse-echo technique in accordance with the invention, it will be appreciated that many changes and modifications may be made therein without, however, departing from the essential spirit of the invention as defined in the annexed claims.

What is claimed is:

1. Ultrasonic apparatus for exploring and mapping the internal structure of a living body, the structure to be explored being subject to pulsation due to the heart beat of said living body, said apparatus comprising an ultrasonic transducer for producing a beam of ultrasonic energy to be directed in a path into said body, a scanner mechanism coupled to said transducer to reciprocate the position thereof to effect a scanning action within said body, a pulse generator coupled to said transducer to excite same periodically to produce periodic pulses at a relatively high rate, a receiver coupled to said transducer to detect echo pulses appearing in the intervals between transmitted pulses, a cathode-ray indicator having an intensity control electrode and first and second orthogonal deflection elements a sweep circuit coupled to one of said elements to produce a periodic time base sweep of the cathode-ray beam, resolver means responsive to the movement of said scanner mechanism and coupled to said other deflection element to produce a deflection voltage as a function of transducer movement, means to apply said echo pulses to said intensity control electrode to vary the beam intensity accordingly, a sync generator coupled to said pulse generator and said sweep circuit to effect initiation of said sweep upon transmission of an ultrasonic pulse, and means responsive to the heart beat of said living body to synchronize the operation of said sync generator therewith.

2. A system as set forth in claim 1, wherein said heart beat synchronization means includes a second transducer coupled to said body to derive control pulses in response to the heart action thereof, which control pulses are applied to said sync generator.

3. Apparatus as set forth in claim 1, wherein said scanner mechanism is caused to rock back and forth to scan a sector of said body, and said indicator produces a "B" presentation of the scanned sector.

4. Apparatus as set forth in claim 3, wherein said sync generator is a free-running multivibrator.

5. Apparatus as set forth in claim 1, wherein said resolver means is a potentiometer coupled to said scanner mechanism.

6. Apparatus as set forth in claim 1, wherein said cathode-ray indicator produces a "B" display in polar coordinates of a section of said body.

7. Apparatus as set forth in claim 1, wherein said cathode-ray indicator produces a "B" display in rectangular coordinates of a section of said body.

8. Apparatus as set forth in claim 1, wherein said ultrasonic pulses have a duration of about two micro-seconds and are transmitted at a rate of about 1000 per second.

References Cited by the Examiner

UNITED STATES PATENTS 3,086,390  4/1963  Brown _____ 73—67.8

FOREIGN PATENTS 997,046  12/1951  France.

OTHER REFERENCES

Wild et al.: article in periodical, "Electronics," March 1955 issue, pp. 174–180.

Reid et al.: article in periodical, "Electronics," July 1952 issue, pp. 137–138.

RICHARD C. QUEISSER, *Primary Examiner.*

JOHN P. BEAUCHAMP, *Examiner.*